(12) United States Patent
Khoryaev et al.

(10) Patent No.: US 9,596,069 B2
(45) Date of Patent: Mar. 14, 2017

(54) NARROW BANDWIDTH DEVICE IN A BROADBAND NETWORK

(75) Inventors: Alexey Khoryaev, Dzerzhinsk (RU); Andrey Chervyakow, Nizhny Novgorod (RU); Jong-Kae Fwu, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 912 days.

(21) Appl. No.: 13/538,762

(22) Filed: Jun. 29, 2012

(65) Prior Publication Data
US 2013/0114587 A1 May 9, 2013

Related U.S. Application Data

(60) Provisional application No. 61/556,109, filed on Nov. 4, 2011.

(51) Int. Cl.
*H04L 5/06* (2006.01)
*H04L 27/26* (2006.01)
(Continued)

(52) U.S. Cl.
CPC .......... *H04L 5/0094* (2013.01); *H04L 5/0037* (2013.01); *H04L 5/0044* (2013.01);
(Continued)

(58) Field of Classification Search
CPC ............... H04L 5/0094; H04L 27/2602; H04L 27/2657; H04W 72/1289; H04B 7/2621
(Continued)

(56) References Cited

U.S. PATENT DOCUMENTS 8,335,196 B2 * 12/2012 Das et al. ............... 370/337
8,345,592 B2 * 1/2013 Parkvall et al. ............... 370/318
(Continued)

FOREIGN PATENT DOCUMENTS

CN 101808370 A 8/2010
CN 102143503 A 8/2011
(Continued)

OTHER PUBLICATIONS

International Search Report and Written Opinion received for PCT Patent Application No. PCT/US2012/063369 mailed on Mar. 25, 2013, 12 pages.
(Continued)

*Primary Examiner* — Timothy J Weidner
(74) *Attorney, Agent, or Firm* — Thorpe North & Western

(57) ABSTRACT

Technology for communicating with a narrow bandwidth wireless device in a broadband network is disclosed. One method can include the wireless device retrieving at least one of secondary narrow bandwidth device region (NBDR) configuration information or primary NBDR configuration information from a primary NBDR located in a physical downlink shared channel (PDSCH) region of a subframe. The primary NBDR and the secondary NBDRs can be subsets of frequency resources within a wide bandwidth subframe. The wireless device can receive data in at least one of the primary NBDR and the secondary NBDR based on the configuration information. The primary NBDR can be located in the central part of a signal bandwidth spectrum including direct current (DC) subcarrier. The secondary NBDR can use frequency resources within the subframe not used by the primary NBDR.

32 Claims, 9 Drawing Sheets

(51) Int. Cl.
*H04W 4/00* (2009.01)
*H04W 72/12* (2009.01)
*H04L 5/00* (2006.01)

(52) U.S. Cl.
CPC .......... *H04L 5/0053* (2013.01); *H04L 5/0064* (2013.01); *H04L 27/2602* (2013.01); *H04L 27/2657* (2013.01); *H04W 4/005* (2013.01); *H04W 72/1289* (2013.01)

(58) Field of Classification Search
USPC ........................................................ 370/331
See application file for complete search history.

(56) References Cited

U.S. PATENT DOCUMENTS

| | | | | |
|---|---|---|---|---|
| 8,520,619 | B2* | 8/2013 | Hong et al. | 370/329 |
| 8,654,666 | B2* | 2/2014 | Chung et al. | 370/252 |
| 2008/0069060 | A1* | 3/2008 | Das et al. | 370/337 |
| 2010/0067418 | A1 | 3/2010 | Parkvall et al. | |
| 2010/0067464 | A1* | 3/2010 | Higuchi | 370/329 |
| 2010/0329384 | A1* | 12/2010 | Kwak et al. | 375/295 |
| 2011/0170496 | A1* | 7/2011 | Fong et al. | 370/329 |
| 2011/0211489 | A1* | 9/2011 | Chung et al. | 370/252 |
| 2011/0249633 | A1* | 10/2011 | Hong et al. | 370/329 |
| 2012/0281567 | A1* | 11/2012 | Gao et al. | 370/252 |
| 2013/0064119 | A1* | 3/2013 | Montojo et al. | 370/252 |
| 2013/0114393 | A1* | 5/2013 | Lee | H04L 5/0048 370/210 |
| 2013/0301552 | A1* | 11/2013 | Xu et al. | 370/329 |

FOREIGN PATENT DOCUMENTS

| | | |
|---|---|---|
| KR | 10-2011-0101086 A | 9/2011 |
| WO | WO 2011/018419 A1 | 2/2011 |
| WO | WO 2013/049520 A1 | 4/2013 |
| WO | 2013/067386 A1 | 5/2013 |

OTHER PUBLICATIONS

Fujitsu, "On Support of Low-Cost MTC Terminals with Reduced Tx/Rx Bandwidths", 3GPP TSG-RAN WG1 R1-112669, Aug. 2011, Meeting 66, Agenda 6.9, Athens, Greece.
NTT DOCOMO, "Physical Channel Concept for Scalable Bandwidth in Evolved UTRA Downlink", 3GPP TSG RAN WG1 Ad Hoc on LTE R1-050592, Jun. 2005, Agenda 4.1, Sophia Antipolis, France.
Office Action for Japanese application 2014-540144, mailing date May 12, 2015, 8 pages including English translation.
Renesas Mobile Europe Ltd, "Standards Aspects of Low-Cost MTC LTE UEs", 3GPP TSG-RAN WG1 R1-113180, Oct. 2011, Meeting 66bis, Agenda 7.6, Zhuhai, China.
Search Report for European application 12846414.6, dated Jul. 30, 2015, 13 pages.
Search Report for International application PCT/US2012/063369. Mailing date May 15, 2014, 9 pages.
Research in Motion et al, "Design Consideration for E-PDCCH", 3GPP TSG RAN WG1R1-112373, Aug. 2011, Meeting 66, Agenda 6.6.2.2, Athens, Greece, 9 pages.

* cited by examiner

NARROW BANDWIDTH DEVICE IN A BROADBAND NETWORK

RELATED APPLICATIONS

This application claims the benefit of and hereby incorporates by reference U.S. Provisional Patent Application Ser. No. 61/556,109, filed Nov. 4, 2011.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use OFDM modulation for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (or eNodeB) to the wireless device (or UE), and the uplink (UL) transmission can be a communication from the wireless device to the node.

A wireless device can include a human-oriented wireless device (e.g., human operated wireless device), a machine type communication (MTC) device, and/or a machine-to-machine (M2M) device. The human operated wireless device can include a computing device configured with a interface to be operated by a human operator capable of wireless digital communication such as a smart phone, a tablet computing device, a laptop computer, a multimedia device such as an iPod Touch®, or other type computing device that provides text or voice communication. A MTC or M2M device can include a sensor and/or a processor configured to automatically access and communicate wirelessly with a RAN. As used herein, MTC and M2M may be used interchangeably.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
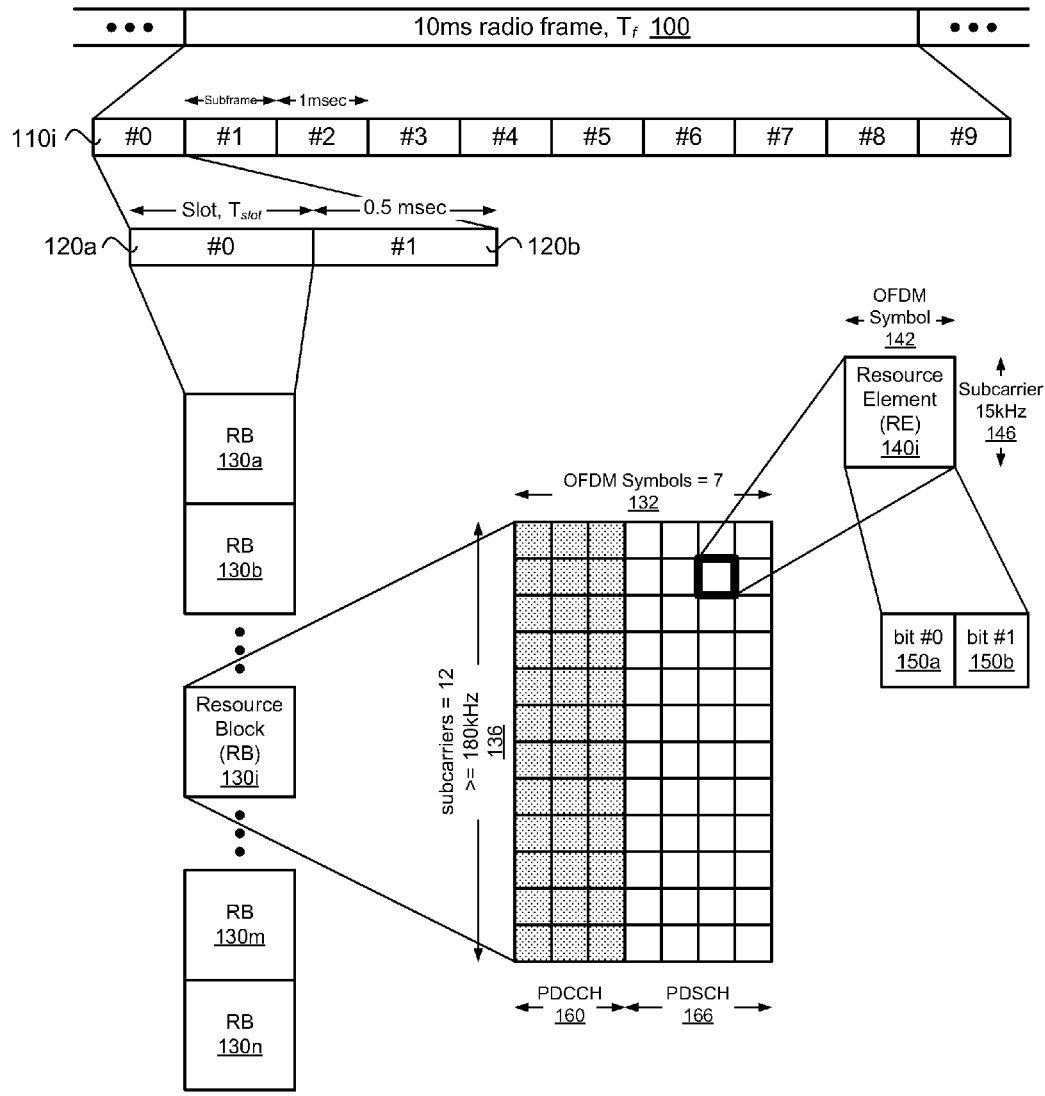
FIG. 1 illustrates a block diagram of radio frame resources in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The machine type communication (MTC) can provide various types of services and automated connectivity via a wireless network. As various services expand and connectivity increases, a larger number of MTC devices may be connected to the network. Many MTC devices can be characterized by a low data rate, infrequent transmissions, and very low power consumption. In some examples, MTC devices can also be a low cost device. The factors associated with MTC devices can significantly differentiate the MTC devices from traditional human-oriented devices. In an example, both communication device types (e.g., the human-oriented devices and the MTC devices) can seamlessly operate in one wireless network (or RAN). Some wireless communication systems can be designed to optimize performance mainly for human type of communications, and thus those wireless communication systems may not optimally accommodate MTC specific requirements.

The efficient support of MTC devices can include additional features to wireless networks designed for human-oriented wireless devices to provide optimization for MTC devices as well as human-oriented wireless devices.

In an example, the MTC devices can include low cost GSM/GPRS terminals or low cost LTE terminals, where GSM is an acronym for Global System for Mobile Communications, originally Groupe Spécial Mobile, and GPRS is an acronym for general packet radio services. In an example, a significant portion of the cost of a wireless device can be the components used to support a wide signal bandwidth. Since many MTC devices do not have a high peak throughput requirement, reducing a maximum bandwidth supported by MTC devices can be beneficial from a cost reduction perspective. For example, the LTE specification can support a scalable set of signal bandwidths (e.g. 1.4, 3, 5, 10, 15, and 20 megahertz [MHz]) and some wireless devices (e.g., higher cost devices) can support the entire set of signal bandwidths while other wireless devices (e.g., lower cost devices) may only support some of the signal bandwidths (e.g., low bandwidth).

As many of the human-oriented wireless devices accessing the wireless network can have high data rates, wireless network specifications, such as the LTE specification, may eliminate operation of narrow bandwidth (e.g. 1.4 and 3 MHz) devices (e.g., MTC devices) used for lower data rate in the wideband (e.g., 10 and 20 MHz) legacy network to optimize data rates for wide bandwidth devices. A limitation that can restrict operation of narrow bandwidth wireless devices in legacy networks can come from a wideband transmission of control channels in downlink. For example, the physical downlink control channel (PDCCH) can be used to perform resource assignment within a subframe distributed over a full system bandwidth, so the wireless devices are to decode the PDCCH before receiving the assigned data resource. Additionally, a physical control format indicator channel (PCFICH) and a physical hybrid automatic repeat request (hybrid-ARQ) indicator channel (PHICH) can also be transmitted in a wide band distributed over a whole signal bandwidth. The control region for a downlink subframe can include the PCFICH, the PHICH, and the PDCCH. The transmission of the control region channels in a wideband (e.g. 10 MHz) can complicate or make receiving the control region channels difficult for narrow bandwidth devices (e.g. devices operating with 1.4 MHz). Narrow band control channels can facilitate reception of control information by narrow bandwidth devices.

In one example, the PDCCH can represent elements of a radio frame structure transmitted on the physical (PHY) layer in a downlink transmission between a node (e.g., eNodeB) and the wireless device (e.g., UE) using a generic long term evolution (LTE) frame structure, as illustrated in FIG. 1.

FIG. 1 illustrates a downlink radio frame structure type 2. In the example, a radio frame 100 of a signal used to transmit the data can be configured to have a duration, $T_f$, of 10 milliseconds (ms). Each radio frame can be segmented or divided into ten subframes $110i$ that are each 1 ms long. Each subframe can be further subdivided into two slots $120a$ and $120b$, each with a duration, $T_{slot}$, of 0.5 ms. The first slot (#0) $120a$ can include a physical downlink control channel (PDCCH) 160 and/or a physical downlink shared channel (PDSCH) 166, and the second slot (#1) $120b$ can include data transmitted using the PDSCH. Each slot for a component carrier (CC) used by the transmitting station and the receiving station can include multiple resource blocks (RBs) $130a$, $130b$, $130i$, $130m$, and $130n$ based on the CC frequency bandwidth. The CC can have a carrier frequency having a bandwidth and center frequency. Each RB (physical RB or PRB) $130i$ can include 12-15 kHz subcarriers 136 (on the frequency axis) and 6 or 7 orthogonal frequency-division multiplexing (OFDM) symbols 132 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) $140i$ using short or normal cyclic prefixing, or the resource block can be mapped to 72 REs (not shown) using extended cyclic prefixing. The RE can be a unit of one OFDM symbol 142 by one subcarrier (i.e., 15 kHz) 146. Each RE can transmit two bits $150a$ and $150b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Figure 2:
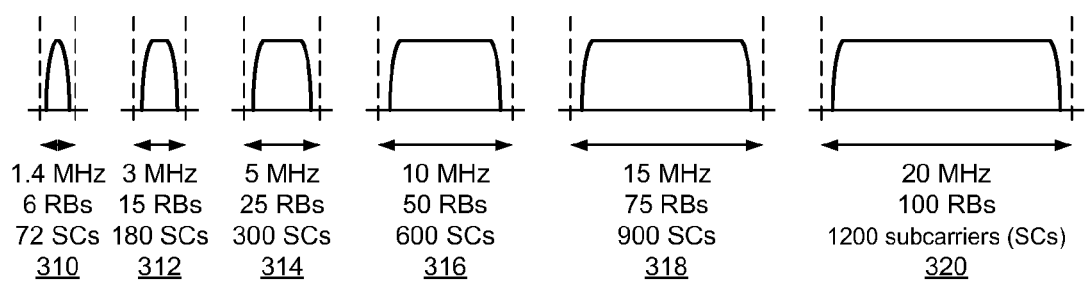
FIG. 2 illustrates a block diagram of various component carrier (CC) bandwidths in accordance with an example.

Each wireless device may use at least one signal bandwidth, carrier bandwidth, or component carrier (CC), as illustrated in FIG. 2. For example, the LTE CC bandwidths can include: 1.4 MHz 310, 3 MHz 312, 5 MHz 314, 10 MHz 316, 15 MHz 318, and 20 MHz 320. The 1.4 MHz CC can include 6 RBs comprising 72 subcarriers. The 3 MHz CC can include 15 RBs comprising 180 subcarriers. The 5 MHz CC can include 25 RBs comprising 300 subcarriers. The 10 MHz CC can include 50 RBs comprising 600 subcarriers. The 15 MHz CC can include 75 RBs comprising 900 subcarriers. The 20 MHz CC can include 100 RBs comprising 1200 subcarriers.

The legacy PDCCH can have capacity constraints that prevent efficient operation of modern signal processing techniques (e.g. MU-MIMO) and enhanced features, such as coordinated multipoint (CoMP) and carrier aggregation. The enhanced PDCCH channel (ePDCCH) can be added to improve performance characteristics of PDCCH. In an example, the ePDCCH can be transmitted in a frequency division multiplexing (FDM) mode (i.e., occupy part of a wide bandwidth). The ePDCCH can also support operations of narrow bandwidth wireless devices (e.g., MTC devices) in a legacy wireless network accommodating wide bandwidth devices, if configured for localized transmission modes.

Technology (e.g., methods and systems) can be used to enable the coexistence of narrow bandwidth wireless devices (e.g., MTC devices) with regular wide bandwidth wireless device (e.g., human-oriented devices and terminals) in a wide bandwidth wireless network that can allow access and communication by low-cost narrow bandwidth wireless devices. A localized transmission of the control channels (e.g. ePDCCH) within a narrow bandwidth device region (NBDR) can support the operation of narrow bandwidth devices in wider bandwidth networks with arbitrary bandwidth configurations.

As previously discussed, FIG. 1 illustrates a subframe $110i$ structure used in the LTE technology. The basic LTE frame format supports scalable spectrum allocations (e.g., 1.4 MHz, 3 MHz, 5 MHz, 10 MHz, 15 MHz and 20 MHz [FIG. 2]), as illustrated in FIGS. 1 and 2. The available spectrum can be divided into physical resource blocks (PRBs) $130a$, $130b$, $130i$, $130m$, and $130n$ (FIG. 1) composed of 12 subcarriers 136 (FIG. 1) each with 15 kHz subcarrier spacing (e.g., 6, 15, 25, 50, 75, 100 PRBs respectively [FIG. 2]).

Figure 3:
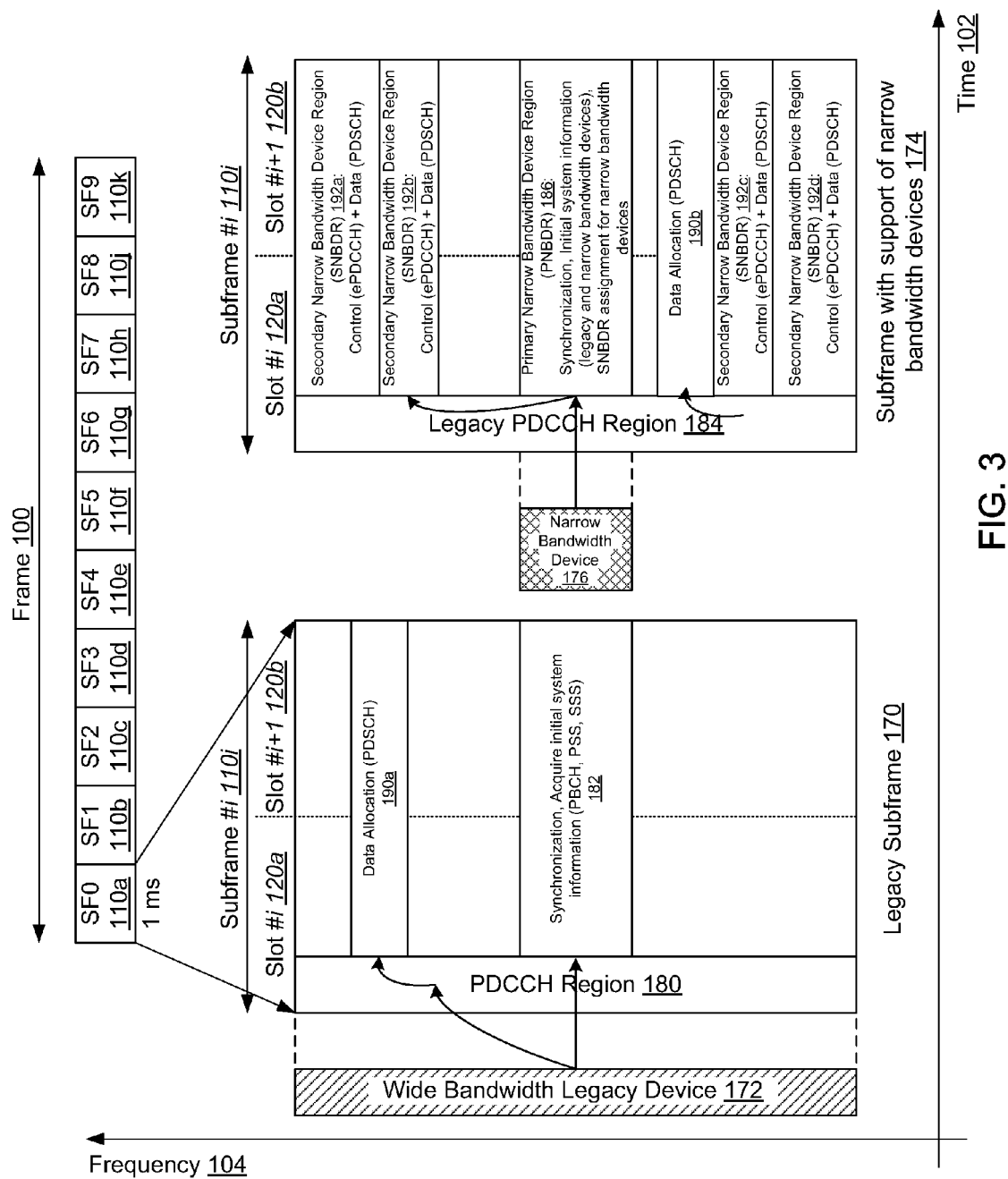
FIG. 3 illustrates a block diagram of a legacy radio subframe and a radio subframe accommodating a primary narrow bandwidth device region (NBDR) and a secondary NBDR in accordance with an example.

FIG. 3 illustrates another example of block diagram of a legacy subframe 170 (e.g., 110a-k) for a specified time 102 and frequency 104. The PDCCH region 180 for a wide bandwidth legacy device 172 can span a full bandwidth. The PDCCH can provide control information to a data allocation in a PDSCH 190a. The transmission of main synchronization signals (e.g., primary synchronization signals [PSS] and secondary synchronization signals [SSS]) 182 can occupy a central part of an available spectrum of the wide bandwidth subframe along with a physical broadcast channel (PBCH). In an example, the main synchronization signals can be limited to a narrow bandwidth allocation (e.g., 6 PRBs) around a central direct current (DC) subcarrier. Because the bandwidth of the synchronization signals can be limited to an approximately 1.4 MHz bandwidth, in an example, the wireless device (e.g., the wide bandwidth device or the narrow bandwidth device) can have at least a 1.4 MHz bandwidth to perform system acquisition and to process the synchronization signals. Thus, in an example, a minimal supported bandwidth device can have a bandwidth of at least 1.4 MHz. Such minimal supported bandwidth device can also decode the legacy PBCH since a PBCH position in a frame can be pre-determined and located in the narrow bandwidth allocation in the center of the available spectrum similar to synchronization signals. Transmission of important system information may be also carried out in the central part of the spectrum or acquired through a specific narrow bandwidth control message that can be transmitted in central part of the spectrum.

FIG. 3 also illustrates a block diagram of a radio subframe (e.g., 110a-k) with support of narrow bandwidth devices 174 accommodating a primary narrow bandwidth device region (NBDR) and a secondary NBDR. In an example, a narrow bandwidth device 176 may not be configured to decode (or may not be capable of decoding) the control information in a full bandwidth of legacy PDCCH region 184. To support operation of narrow bandwidth wireless device (e.g., MTC or other type of devices) in a wireless network with arbitrary bandwidth configuration, the available spectrum can be divide into multiple narrow bandwidth regions or narrow bandwidth device regions (NBDR) of a certain granularity in frequency (e.g., 1.4 MHz). For illustration purposes, the NBDR can be considered as chunks of physical spectrum where narrow bandwidth wireless devices can communicate with a node (e.g., eNodeB). For example, the granularity can be defined to be equal to 6 PRBs (e.g., 1.4 MHz), 15 PRBs (e.g., 3 MHz) or other fixed or variable granularity for a wireless device or wireless system.

Two types of logical NBDRs can include a primary NBDR 186 and secondary NBDRs 192a-d. The NBDRs can be overlaid on top of the legacy PDSCH region and can be transparent to the wide bandwidth wireless device (e.g., a legacy UE) communicating with the wireless network, which are not using the NBDRs (i.e., the NBDRs may not interfere with wide bandwidth wireless device operation). The two types of regions (e.g., primary NBDR [PNBDR] and secondary NBDRs [SNBDRs]) can be used to preserve an existing system capacity to allow for multiple simultaneously supported narrow bandwidth devices.

In an example, the primary NBDR (PNBDR) 186 can be allocated to a narrow bandwidth located in a central part of the spectrum for the wide bandwidth subframe. The primary NBDR can provide initial system information to narrow bandwidth devices, which can include legacy system information (previously described) as well as relevant information for support of narrow bandwidth devices, such as a number of NBDRs in the available bandwidth, an allocation of NBDRs, an assignment of NBDRs, a configuration of NBDRs, or NBDRs frequency hopping pattern. In an example, the primary NBDR can also include NBDR configuration information. The NBDR configuration information can indicate to the narrow bandwidth wireless device, the logical narrow bandwidth region (e.g., NBDR) that the narrow bandwidth wireless device can use to communicate with the node (e.g, eNodeB) via control messaging. The NBDR configuration information can be provided by a physical control channel (e.g., ePDCCH, PBCH, or newly defined or existing DL control channel located in the central part of spectrum) or upper layer signaling (e.g., radio resource control [RRC] signaling, system information signaling, broadcast control signaling, media access control [MAC] signaling). In an example, the primary NBDR can also be used for data transmission or data communication between a narrow bandwidth wireless device and the node, if additional resources in the primary NBDR are available data (besides synchronization, system, and configuration information).

In an example, the secondary NBDRs (SNBDRs) 192a-d can be used for data transmission or data communication between a narrow bandwidth wireless device and the node. Multiple secondary NBDRs can increase system capacity in terms of the number of narrow bandwidth wireless devices (e.g., low-cost wireless devices) that can be simultaneously served by the wireless network (in the subframes). In an example, the use of the secondary NBDRs can be optional. The configuration and allocation of secondary NBDR can be provided dynamically or semi-statically to wireless devices in the primary NBDR 186, physical layer signaling (e.g., ePDCCH, PBCH, or newly defined or existing DL control channel located in the central part of spectrum), or upper layer signaling (e.g., radio resource control [RRC] signaling, system information signaling, broadcast control signaling, media access control [MAC] signaling). In another example, the configuration and allocation of secondary NBDR may be explicitly specified in specification for each bandwidth configuration. In an example, each secondary NBDR may include a control channel (e.g. ePDCCH or other control channel specifically designed for operation of narrow bandwidth devices) for scheduling allocations in the secondary NBDR. Alternatively, resource allocation information can be transmitted in the primary NBDR. In an example to reduce or preserve narrow bandwidth transmission to a wireless device (e.g., switching between the primary NBDR and the secondary NBDR), the time-frequency resources can be assigned for the consecutive subframes.

Both the primary NBDR 186 and secondary NBDRs 192a-d can be configured to transmit data via a data channel (i.e. PDSCH). With the NBDR overlay, the legacy PDCCH 184 still can provide control information to a data allocation in a PDSCH 190b for the wide bandwidth wireless device, while the NBDRs can provide control information and data to the wide bandwidth wireless device. Primary NBDR can transmit initial information on a configuration of the NBDRs. The secondary NBDR configuration information can be provided in primary NBDRs or secondary NBDRs using RRC signaling, system information signaling, broadcast control signaling, or MAC signaling transmitted in the PDSCH. In another example, resource allocation control signaling for the secondary NBDR may also be transmitted in the primary NBDR.

In another configuration, the NBDR in the frame structure can receive control information via the ePDCCH, which can be transmitted in a frequency division duplexing (FDM) mode and/or can be configured for localized transmission. The ePDCCH (or other control channel with similar functionality) may include control information for pointing to an allocation for the corresponding NBDRs as well as providing allocation within the NBDR. Alternatively, the allocation of narrow bandwidth devices corresponding to NBDRs can be assigned using upper layer control signaling (e.g., RRC signaling, system information signaling, broadcast control signaling, or MAC signaling). Upper layer control signaling, higher layer signaling, and/or MAC control elements can be transmitted in either the primary NBDR or secondary NBDR. The signaling can be used for the NBDRs' configuration in LTE frame structure (i.e. information of the NBDRs' positions and/or patterns), or a semi-static assignment of secondary NBDRs. In an example, the ePDCCH can be used for a dynamic assignment of DL resources (e.g., PDSCH) for narrow bandwidth wireless devices within an assigned NBDR, a dynamic assignment of UL resources (e.g., physical uplink shared channel [PUSCH]), and a dynamic assignment of secondary NBDRs. In another example, the narrow bandwidth wireless device can be tuned to the NBDR frequency (via a radio frequency [RF] analog frequency translation and/or a baseband digital frequency translation) based on the secondary NBDR assignment. Then, the narrow bandwidth wireless device can continue operation at the NBDR frequency (e.g., receive data in the secondary NBDR). Periodically, to maintain synchronization and/or to receive system information transmitted in the central part the signal bandwidth spectrum (e.g., master information block [MIB], system information block [SIB], and/or NBDR specific information), the narrow bandwidth wireless device may retune the frequency back (or return back) to central part the wide bandwidth spectrum to receive the primary NBDR.

Figure 4:
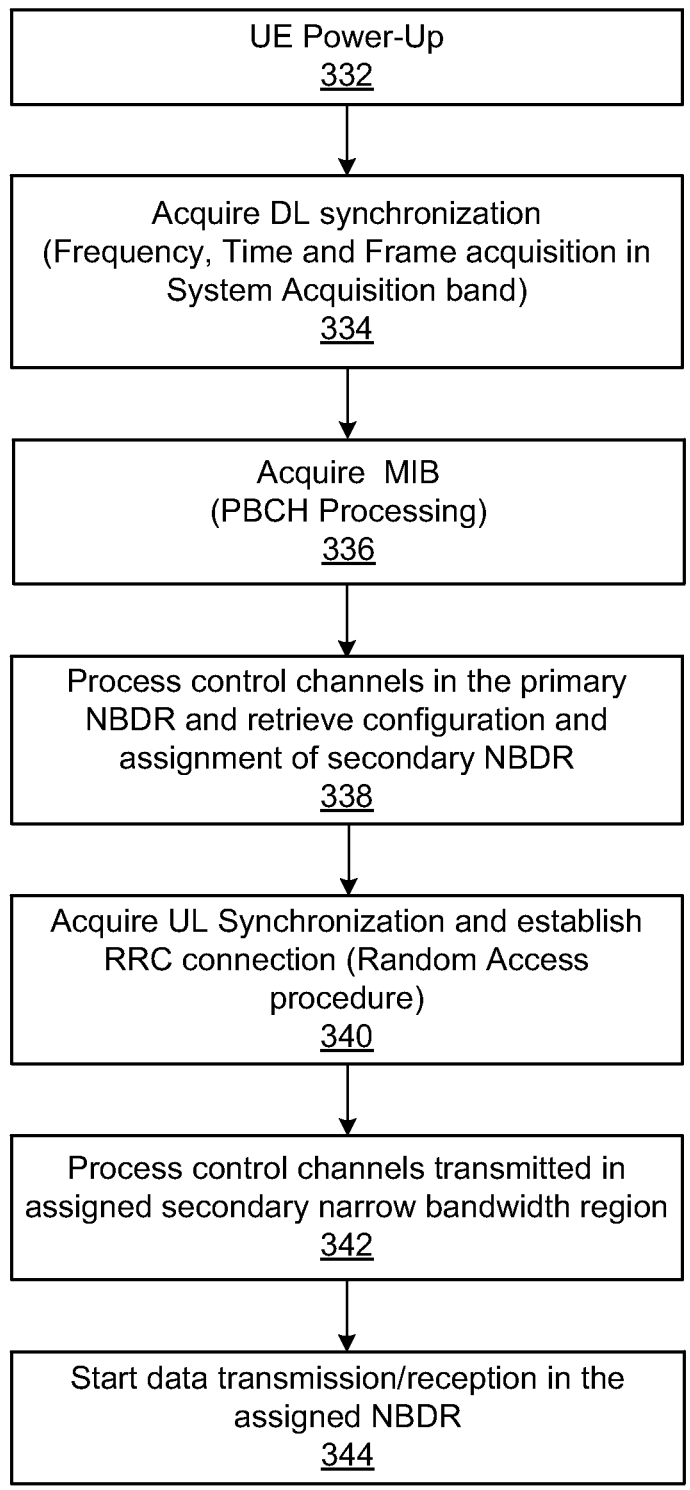
FIG. 4 illustrates a flow chart of narrow bandwidth device region (NBDR) operation in accordance with an example.

FIG. 4 illustrates an example flow chart of a high level operation of a narrow bandwidth wireless device. Initially, the narrow bandwidth wireless device (e.g., UE) can power-up 332 with the associated procedures. The wireless device can acquire DL synchronization 334, which can include frequency, time, and frame acquisition in a system acquisition band. Then, the wireless device can process control channels transmitted in the primary NBDR and retrieve a configuration and an assignment of secondary NBDR 338. In an example, the wireless device can acquire UL synchronization and establish a RRC connection in a random access procedure 340. If needed, the wireless device can tune to a secondary NBDR frequency. Next, the wireless device can process control channels transmitted in assigned secondary NBDR 342. Then, the wireless device can start data reception from the node and data transmission to the node in the assigned NBDR 344.

Figure 5A:
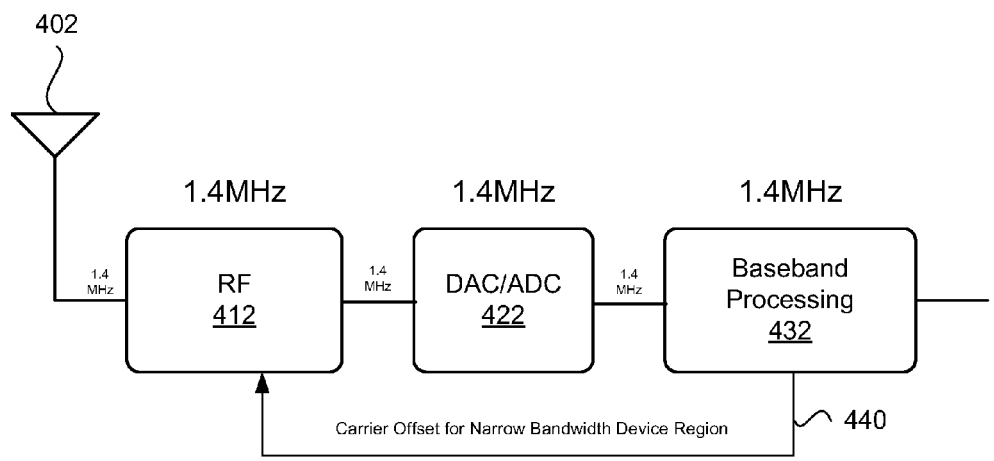
FIG. 5A illustrates a block diagram of radio frequency (RF) analog frequency translation in a narrow bandwidth device in accordance with an example.
Figure 5B:
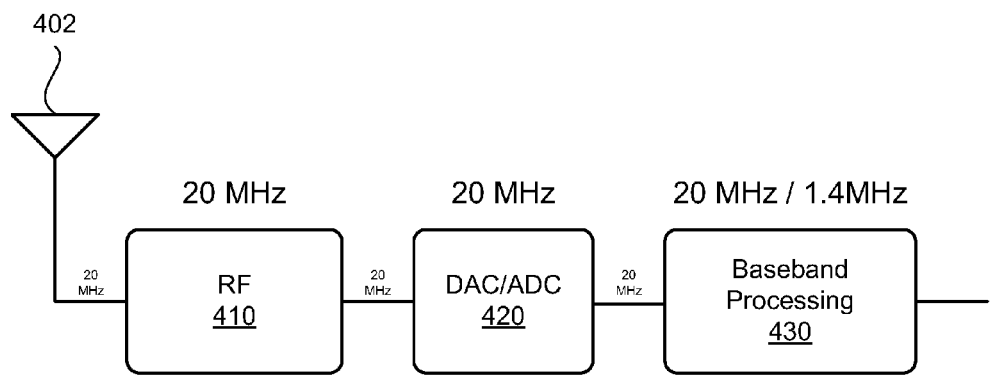
FIG. 5B illustrates a block diagram of baseband digital frequency translation in a narrow bandwidth device in accordance with an example.

The method and system described allows a narrow bandwidth wireless device to monitor a part (e.g., 1.4 or 3 MHz) of the wide bandwidth spectrum (e.g., 10 or 20 MHz) and thus the narrow bandwidth wireless device can operate at reduced peak data rate. The bandwidth reduction and corresponding signal processing for the narrow bandwidth wireless device can be performed either in a RF receiver 412 (FIG. 5A) or in a baseband processing module 430 (FIG. 5B), as illustrated in FIGS. 5A and 5B for DL only, UL only, or both DL and UL. The downlink signal can be received on an antenna 402. The RF chain can be configured to receive and transmit the analog channel signal in the assigned NBDR.

In one embodiment as illustrated in FIG. 5A, both the RF receiver 412, a digital-to-analog converter (DAC)/analog-to-digital converter (ADC) module 422, and a baseband processing module 432 of the narrow bandwidth wireless device may be designed to support narrow bandwidth signal processing. The digital-to-analog converter (DAC)/analog-to-digital converter (ADC) module can be configured to covert between an analog channel signal and a digital modulated signal, which can be decoded (for reception) or encoded (for transmission). In an example, after decoding of system information in the primary NBDR and if the node (e.g., eNodeB) has assigned secondary region for data transmission, the baseband processing module can transmit a command to the RF synthesizer of the RF receiver to apply a carrier offset for the NBDR 440 in order to adjust the narrow bandwidth wireless device's frequency and tune the frequency of RF receiver to a center of the assigned secondary NBDR region for further filtering and processing. The carrier offset mechanism can allow the components of the narrow bandwidth wireless device to operate at the narrow bandwidth, and provide switching between the primary NBDR and the secondary NBDR. Although 1.4 MHz is showed for an NBDR frequency bandwidth and 20 MHz is showed for a wide frequency bandwidth subframe in FIGS. 5A-B, any NBDR frequency bandwidth and any wide frequency bandwidth subframe may be used as long as the NBDR has a frequency bandwidth narrower than the wide bandwidth subframe.

FIG. 5B illustrates an example of a narrow bandwidth wireless device with baseband digital frequency translation. An RF receiver 410 may receive the full wide bandwidth subframe, which passes through the DAC/ADC module 420, and filtering of the specified NBDR may be performed in a baseband digital front-end unit of a baseband processing module 430. In an example, the narrow bandwidth wireless device of 5B can have a simpler design than the narrow bandwidth wireless device of 5A, because processing of the NBDR can be performed in the baseband processing module. Although FIGS. 5A and 5B illustrate two examples for providing NBDR functionality with lower cost components, other designs for providing a low cost narrow bandwidth wireless device (e.g., MTC device) are also contemplated. For example, other technical solutions for filtering NBDR of the wide signal bandwidth may also support operation of narrow bandwidth wireless devices in wideband legacy networks.

The use of NBDRs can enable support of narrow bandwidth wireless device in a wireless network. The use of NBDRs has various benefits and advantages. Some of benefits can include coexistence of narrow bandwidth wireless devices (e.g., MTC device) with wide bandwidth wireless devices (e.g., human-oriented UEs) in a wide bandwidth wireless network (e.g., LTE network). In an example, the narrow bandwidth wireless devices can be fabricated and constructed using low cost components. The use of NBDRs facilitates a low-cost implementation of narrow bandwidth wireless devices (e.g., MTC devices) in the LTE technology. The use of NBDRs in the wide bandwidth subframe can preserve a high system capacity in terms of a number of supported devices (e.g., narrow bandwidth wireless devices and wide bandwidth wireless devices). In an example, the use of NBDRs provides full compatibility with the legacy wireless devices (e.g., user terminals) and can be nearly transparent for standard wide bandwidth wireless device through node and/or network configuration and scheduling.

Figure 6:
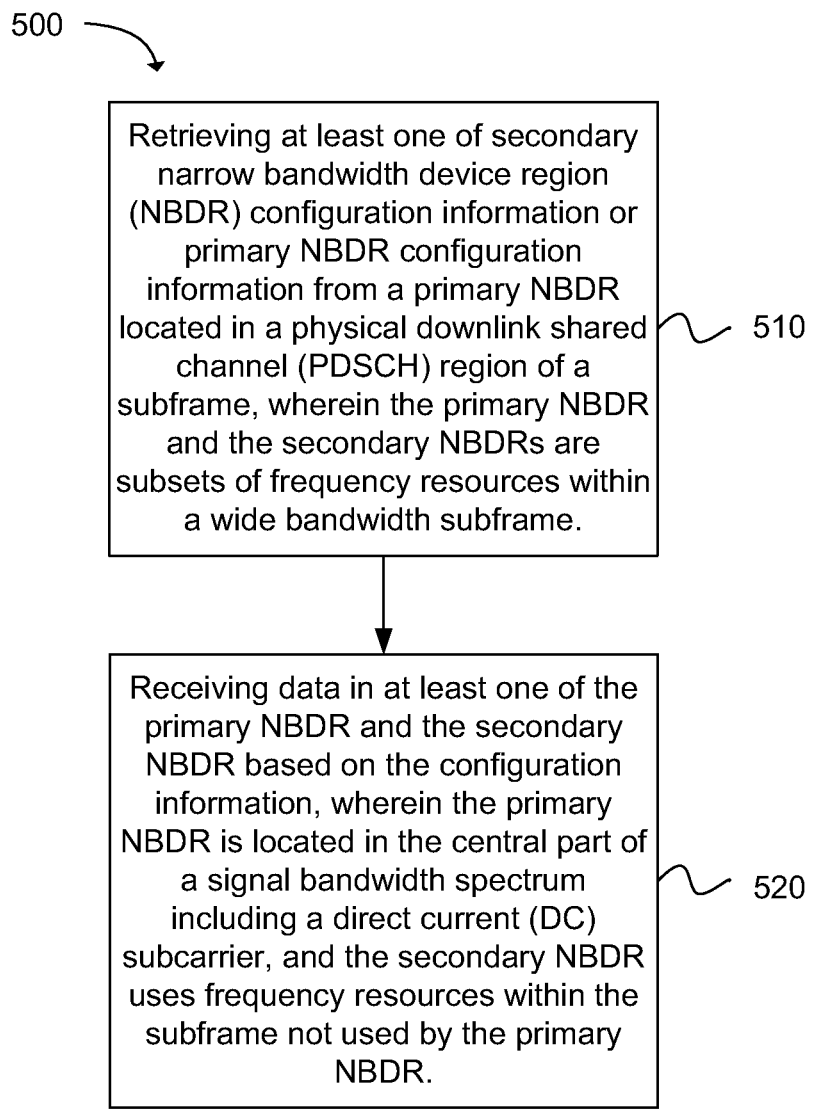
FIG. 6 depicts a flow chart of a method for communicating with a narrow bandwidth wireless device in a broadband network in accordance with an example.

Another example provides a method 500 for communicating with a narrow bandwidth wireless device in a broadband network, as shown in the flow chart in FIG. 6. The method may be executed as instructions on a machine, where the instructions are included on at least one computer readable medium. The method includes the operation of retrieving at least one of secondary narrow bandwidth device region (NBDR) configuration information or primary NBDR configuration information from a primary NBDR located in a physical downlink shared channel (PDSCH) region of a subframe, wherein the primary NBDR and the secondary NBDRs are subsets of frequency resources within a wide bandwidth subframe, as in block 510. The operation of receiving data in at least one of the primary NBDR and the secondary NBDR based on the configuration information, wherein the primary NBDR is located in the central part of a signal bandwidth spectrum including a direct current (DC) subcarrier, and the secondary NBDR uses frequency resources within the subframe not used by the primary NBDR follows, as in block 520.

The method can further include at least one of: processing a control channel transmitted in the primary NBDR prior to receiving the data in the primary NBDR; processing a control channel transmitted in the primary NBDR prior to receiving the data in the secondary NBDR in one of the consecutive subframes; and processing a control channel transmitted in the secondary NBDR prior to receiving the data in the secondary NBDR. The control channel in the primary or secondary NBDR can include an enhanced physical downlink control channel (ePDCCH) for resource scheduling allocations which is transmitted in a frequency division multiplexing (FDM) mode. The method can further include receiving, in the primary NBDR, a frequency location of the secondary NBDR to be used for receiving the data in the secondary NBDR.

In another example, the method can further include receiving control messaging from upper layer signaling indicating the secondary NBDR assignment in the subframe to be used for receiving data. The upper layer signaling can include radio resource control (RRC) signaling, system information signaling, broadcast control signaling, media access control (MAC) signaling, or combination of this signaling. The operation of receiving a physical control channel indicating the secondary NBDR assignment to be used for receiving the data can follow. In an example, each NBDR comprises a number of subcarriers including sixteen or less physical resource blocks (PRBs) corresponding to a bandwidth of approximately 3 megahertz (MHz) or less (e.g., 1.4 MHz [6 PRBs] and 3 MHz [15 PRBs]). The wide bandwidth subframe signal can include a number of subcarriers including at least 24 physical resource blocks (PRBs) corresponding to a bandwidth of approximately 5 MHz or more (e.g., 5 MHz [25 PRBs], 10 MHz [50 PRBs], and 20 MHz [100 PRBs]). In another example, a bandwidth of the NBDR can be narrower than a bandwidth of the wide bandwidth subframe. For example, if the subframe has a bandwidth of 20 MHz, the NBDR bandwidth can be 10 MHz or less. In another example, the subframe can include at least two NBDRs.

The secondary NBDR configuration information can include a number of NBDRs, an allocation of NBDRs, an assignment of NBDRs, a configuration of NBDRs, NBDRs frequency hopping pattern, or combinations of this information. The secondary NBDR configuration information can be communicated via upper layer signaling. The upper layer signaling can include radio resource control (RRC) signaling, system information signaling, broadcast control signaling, media access control (MAC) signaling, and combinations of this signaling.

In another example, the method can further include powering-up the wireless device. The operation of acquiring downlink (DL) synchronization can follow. The next operation of the method can be acquiring a master information block (MIB) using physical broadcast channel (PBCH) processing prior to retrieving secondary NBDR configuration information. The method further includes acquiring uplink (UL) synchronization and establishing a radio resource control (RRC) connection using a random access procedure prior to receiving the data in the secondary NBDR.

Figure 7:
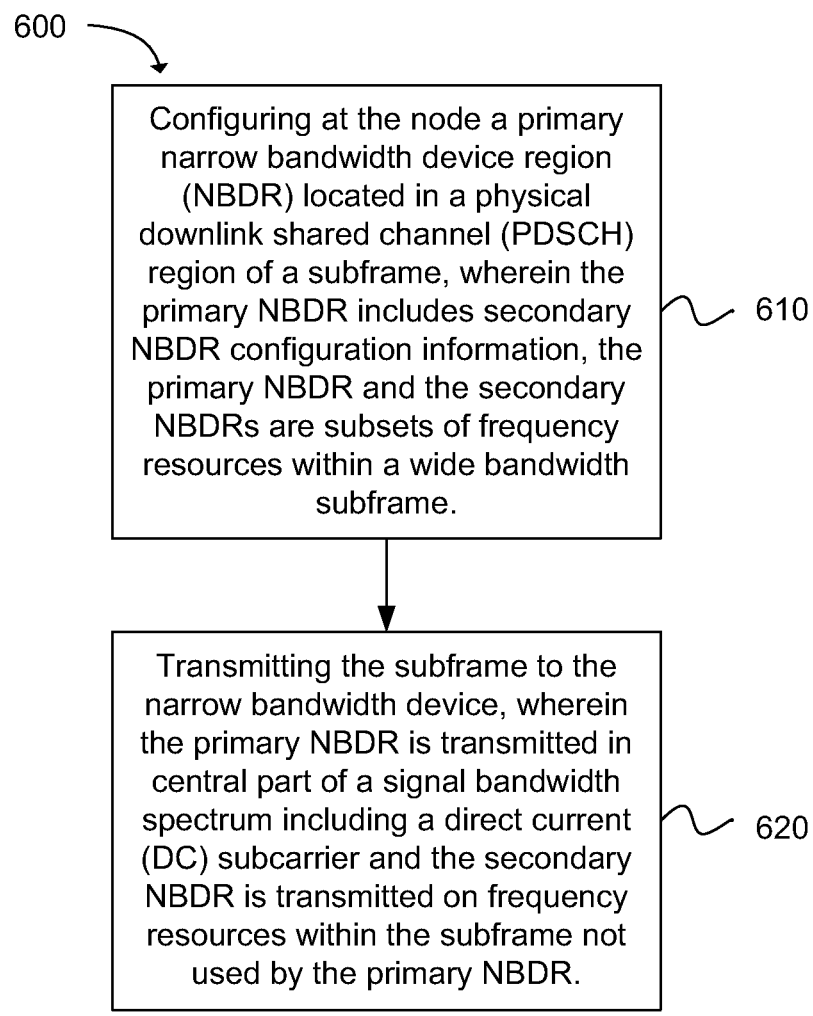
FIG. 7 depicts a flow chart of a method for communicating from a node to a narrow bandwidth wireless device in a broadband network in accordance with an example.

Another example provides a method 600 for communicating from a node to a narrow bandwidth wireless device in a broadband network, as shown in the flow chart in FIG. 7. The method may be executed as instructions on a machine, where the instructions are included on at least one computer readable medium. The method includes the operation of configuring at the node a primary narrow bandwidth device region (NBDR) located in a physical downlink shared channel (PDSCH) region of a subframe, wherein the primary NBDR includes secondary NBDR configuration information, the primary NBDR and the secondary NBDRs are subsets of frequency resources within a wide bandwidth subframe, as in block 610. The operation of transmitting the subframe to the narrow bandwidth device, wherein the primary NBDR is transmitted in central part of a signal bandwidth spectrum including a direct current (DC) subcarrier and the secondary NBDR is transmitted on frequency resources within the subframe not used by the primary NBDR follows, as in block 620.

The secondary NBDR configuration information can include a number of NBDRs, an allocation of NBDRs, an assignment of NBDRs, a configuration of NBDRs, NBDRs frequency hopping pattern, or combinations of this information. The secondary NBDR configuration information can be communicated via upper layer signaling. The upper layer signaling can include radio resource control (RRC) signaling, system information signaling, broadcast control signaling, media access control (MAC) signaling, and combinations of this signaling.

In an example, each NBDR comprises a number of subcarriers including six or more physical resource blocks (PRBs) corresponding to a bandwidth of approximately 3 megahertz (MHz) or less (e.g., 1.4 MHz [6 PRBs] and 3 MHz [15 PRBs]). The wide bandwidth subframe signal can include a number of subcarriers corresponding to a bandwidth of approximately 5 MHz or more (e.g., 5 MHz [25 PRBs], 10 MHz [50 PRBs], and 20 MHz [100 PRBs]). The method can further include transmitting data in the primary or secondary NBDR.

Figure 8:
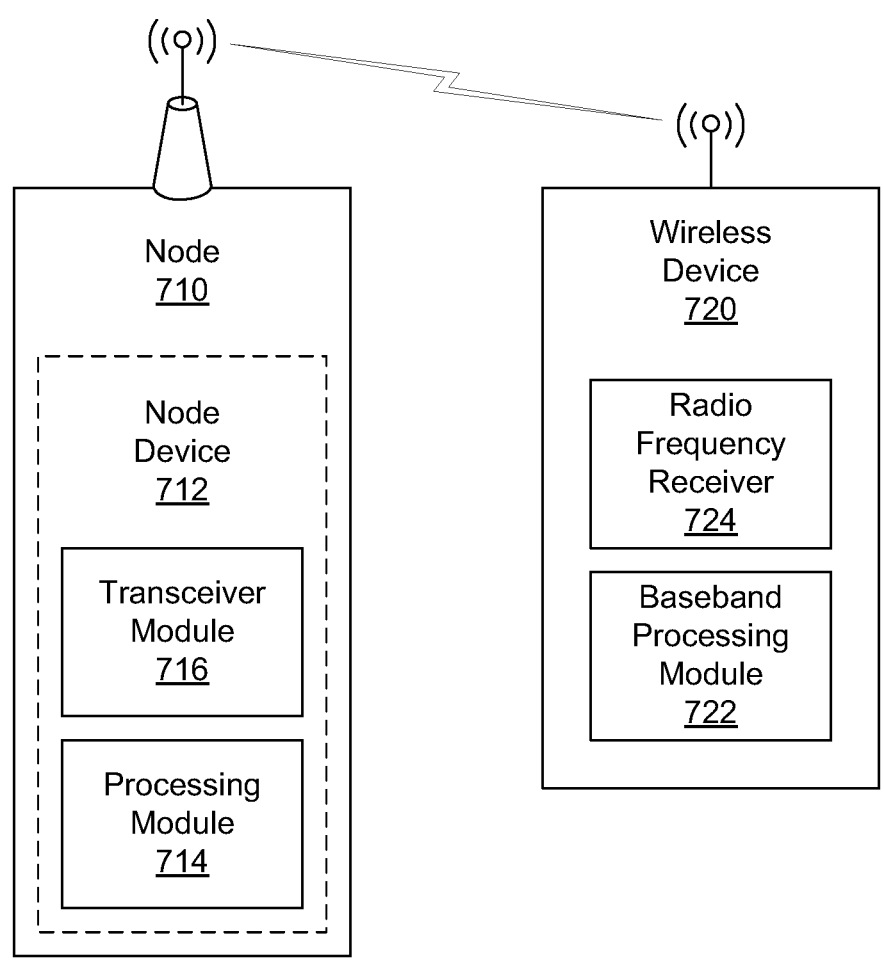
FIG. 8 illustrates a block diagram of a node and wireless device in accordance with an example.

FIG. 8 illustrates an example narrow bandwidth wireless device 720 and node 710. The narrow bandwidth wireless device can include a baseband processing module 722 and a radio frequency receiver 724. The baseband processing module configured to retrieve secondary narrow bandwidth device region (NBDR) configuration information from a primary NBDR located in a physical downlink data channel (PDSCH) region of a subframe, and process data in the secondary NBDR. The baseband processing module can operate in a limited narrow bandwidth. A NBDR can be a subset of frequency resources within the wide bandwidth subframe. The primary NBDR can be located in the central part of a signal bandwidth spectrum including the direct current (DC) subcarrier. The secondary NBDR can use frequency resources within the subframe not used by the primary NBDR. The baseband processing module can be further configured to process control channels and synchronization information in the primary NBDR and acquire from the primary NBDR initial system information. The initial system information can include a physical broadcast channel (PBCH), a primary synchronization signal (PSS), a secondary synchronization signal (SSS), and combinations of this information. The limited narrow bandwidth can be approximately 1.4 megahertz (MHz) or more, and the wide bandwidth subframe has a larger bandwidth (e.g., 10 MHz). In an example, the radio frequency receiver can be configured to receive a wide bandwidth subframe.

In another example, the radio frequency (RF) receiver 724 configured to receive a narrow bandwidth region in the wide bandwidth subframe. The baseband processing module can be further configured to generate a carrier signal offset for the secondary NBDR relative to the DC subcarrier and adjust the RF receiver to a center frequency of the secondary NBDR.

The narrow bandwidth wireless device can include a user equipment (UE) or a mobile station (MS). The narrow bandwidth wireless device can include an antenna, a touch sensitive display screen, a speaker, a microphone, a graphics processor, an application processor, internal memory, a non-volatile memory port, or combinations these components. The narrow bandwidth wireless device can belong to a class of a machine type communication (MTC) device.

The node 710 can include a node device 712. The node device or the node can be configured to communicate with a narrow bandwidth wireless device in a broadband network. The node device can include a processing module 714 and a transceiver module 716. The processing module can be operable to configure narrow bandwidth device regions (NBDRs) located in a physical downlink shared channel (PDSCH) region of a subframe. The NBDRs can be subsets of frequency resources within a wide bandwidth subframe. In an example, the NBDRs can include a primary NBDR and at least one secondary NBDR. In another example, the NBDR can include just the primary NBDR. In an example, the primary NBDR can include secondary NBDR configuration information, and the secondary NBDR can include data. The transceiver module can be configured to transmit the primary NBDR on subcarriers located in the central part of a signal bandwidth spectrum including a direct current (DC) subcarrier, and transmit the secondary NBDR on subcarriers within the subframe not used by the primary NBDR. The subframe can include the primary NBDR and a plurality of secondary NBDRs. The node can be configured to transmit data to a plurality of narrow bandwidth wireless devices using the primary NBDR and secondary NBDRs. Each narrow bandwidth wireless device can be assigned a distinct primary or secondary NBDR for data communication. The node can be configured to communicate with a wireless wide bandwidth device using a bandwidth of at least 10 megahertz (MHz), and the narrow bandwidth wireless device using a bandwidth of approximately 1.4 MHz. The node can include a base station (BS), a Node B (NB), an evolved Node B (eNB), a baseband unit (BBU), a remote radio head (RRH), a remote radio equipment (RRE), or a remote radio unit (RRU).

Figure 9:
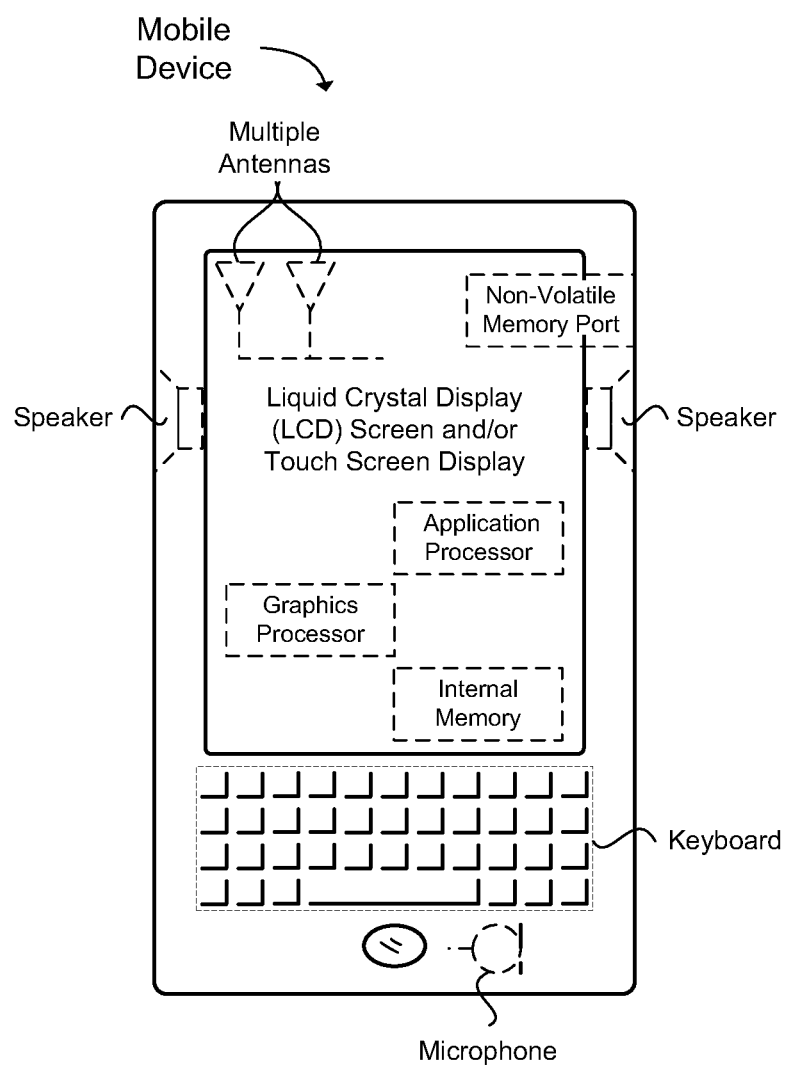
FIG. 9 illustrates a diagram of a wireless device in accordance with an example.

FIG. 9 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 9 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for communicating with a narrow bandwidth wireless device in a broadband network, comprising:
retrieving at least one of secondary narrow bandwidth device region (NBDR) configuration information or primary NBDR configuration information from a primary NBDR, wherein the primary NBDR and the secondary NBDR are located in a physical downlink shared channel (PDSCH) region of a subframe and are subsets of frequency resources within a wide bandwidth subframe, and at least one of the primary NBDR and the secondary NBDR includes both an NBDR-control channel and an NBDR data channel; and
receiving data in at least one of the primary NBDR and the secondary NBDR based on the configuration information, wherein the primary NBDR is located in a central part of a signal bandwidth spectrum including a direct current (DC) subcarrier, and the secondary NBDR uses frequency resources within the subframe not used by the primary NBDR.

2. The method of claim 1, further comprising at least one of:
processing a control channel transmitted in the primary NBDR prior to receiving the data in the primary NBDR;
processing a control channel transmitted in the primary NBDR prior to receiving the data in the secondary NBDR; and
processing a control channel transmitted in the secondary NBDR prior to receiving the data in the secondary NBDR.

3. The method of claim 2, wherein the control channel in the primary or secondary NBDR is an enhanced physical downlink control channel (ePDCCH) for resource scheduling allocations which is transmitted in a frequency division multiplexing (FDM) mode.

4. The method of claim 1, further comprising:
receiving, in the primary NBDR, a frequency location of the secondary NBDR to be used for receiving the data in the secondary NBDR.

5. The method of claim 1, further comprising:
receiving control messaging from upper layer signaling indicating a secondary NBDR assignment in the subframe to be used for receiving data, wherein the upper layer signaling is selected from the group consisting of radio resource control (RRC) signaling, system information signaling, broadcast control signaling, media access control (MAC) signaling, and combinations thereof;
receiving a physical control channel indicating the secondary NBDR assignment to be used for receiving the data.

6. The method of claim 1, wherein each NBDR bandwidth has a bandwidth of approximately 3 megahertz (MHz) or less, and the wide bandwidth subframe signal has a bandwidth of at least 10 megahertz (MHz).

7. The method of claim 1, wherein a bandwidth of at least one of the primary NBDR or the secondary NBDR is narrower than a bandwidth of the wide bandwidth subframe.

8. The method of claim 1, wherein the secondary NBDR configuration information is selected from the group consisting of a number of NBDRs, an allocation of NBDRs, an assignment of NBDRs, a configuration of NBDRs, NBDRs frequency hopping pattern, and combinations thereof.

9. The method of claim 1, wherein the secondary NBDR configuration information is communicated via upper layer signaling, wherein the upper layer signaling is selected from the group consisting of radio resource control (RRC) signaling, system information signaling, broadcast control signaling, media access control (MAC) signaling, and combinations thereof.

10. The method of claim 1, further comprising:
powering-up the wireless device;
acquiring downlink (DL) synchronization;
acquiring a master information block (MIB) using physical broadcast channel (PBCH) processing prior to retrieving secondary NBDR configuration information; and
acquiring uplink (UL) synchronization and establishing a radio resource control (RRC) connection using a random access procedure prior to receiving the data in the secondary NBDR.

11. At least one non-transitory machine readable storage medium comprising a plurality of instructions adapted to be executed to implement the method of claim 1.

12. The method of claim 1, wherein the subframe includes a legacy physical downlink control channel (PDCCH) region and the physical downlink shared channel (PDSCH) region.

13. A method for communicating from a node to a narrow bandwidth device in a broadband network, comprising:
configuring at the node a primary narrow bandwidth device region (NBDR), wherein the primary NBDR includes secondary NBDR configuration information, the primary NBDR and the secondary NBDRs are located in a physical downlink shared channel (PDSCH) region of a subframe and are subsets of frequency resources within a wide bandwidth subframe, and at least one of the primary NBDR and the secondary NBDR includes both an NBDR control channel and an NBDR data channel; and
transmitting the subframe to the narrow bandwidth device, wherein the primary NBDR is transmitted in central part of a signal bandwidth spectrum including a direct current (DC) subcarrier and the secondary NBDR is transmitted on frequency resources within the subframe not used by the primary NBDR.

14. The method of claim 13, wherein the secondary NBDR configuration information is selected from the group consisting of a number of NBDRs, an allocation of NBDRs, an assignment of NBDRs, a configuration of NBDRs, NBDRs frequency hopping pattern, and combinations thereof.

15. The method of claim 13, wherein a bandwidth of at least one of the primary NBDR or the secondary NBDR is narrower than a bandwidth of the wide bandwidth subframe.

16. The method of claim 13, further comprising:
transmitting data in the primary or secondary NBDR.

17. At least one non-transitory machine readable storage medium comprising a plurality of instructions adapted to be executed to implement the method of claim 13.

18. The method of claim 13, wherein the subframe includes a legacy physical downlink control channel (PDCCH) region and the physical downlink shared channel (PDSCH) region.

19. A narrow bandwidth wireless device configured to communicate in a broadband network, comprising:
a baseband processing module configured to retrieve secondary narrow bandwidth device region (NBDR) configuration information from a primary NBDR located in a physical downlink data channel (PDSCH) region of a subframe, and process data in the secondary NBDR located in a physical downlink data channel (PDSCH) region of a subframe, wherein the baseband processing module operates in a limited narrow bandwidth, and a NBDR is a subset of frequency resources within a wide bandwidth subframe, and the primary NBDR is located in a central part of a signal bandwidth spectrum including a direct current (DC) subcarrier, and the secondary NBDR uses frequency resources within the subframe not used by the primary NBDR, and at least one of the primary NBDR and the secondary NBDR includes both an NBDR control channel and an NBDR data channel.

20. The narrow bandwidth wireless device of claim 19, wherein the baseband processing module is further configured to process control channels and synchronization information in the primary NBDR and acquire from the primary NBDR initial system information selected from the group consisting of a physical broadcast channel (PBCH), a primary synchronization signal (PSS), a secondary synchronization signal (SSS), and combinations thereof.

21. The narrow bandwidth wireless device of claim 19, wherein the limited narrow bandwidth is approximately 3 megahertz (MHz) or less, and the wide bandwidth subframe has a bandwidth of at least 10 MHz.

22. The narrow bandwidth wireless device of claim 19, further comprising:
a radio frequency receiver configured to receive a wide bandwidth subframe.

23. The narrow bandwidth wireless device of claim 19, further comprising:
a radio frequency (RF) receiver configured to receive a narrow bandwidth region in the wide bandwidth subframe.

24. The narrow bandwidth wireless device of claim 23, wherein the baseband processing module is further configured to generate a carrier signal offset for the secondary NBDR relative to the DC subcarrier and adjust the RF receiver to a center frequency of the secondary NBDR.

25. The narrow bandwidth wireless device of claim 19, wherein the narrow bandwidth wireless device is selected from the group consisting of a user equipment (UE) and a mobile station (MS), and the narrow bandwidth wireless device includes at least one of an antenna, a touch sensitive display screen, a speaker, a microphone, a graphics processor, an application processor, internal memory, a non-volatile memory port, and combinations thereof.

26. The narrow bandwidth wireless device of claim 19, wherein the narrow bandwidth wireless device belongs to a class of a machine type communication (MTC) device.

27. The narrow bandwidth wireless device of claim 19, wherein the subframe includes a legacy physical downlink control channel (PDCCH) region and the physical downlink shared channel (PDSCH) region.

28. A node device of a node configured to communicate with a narrow bandwidth wireless device in a broadband network, comprising:
a processing module operable to configure narrow bandwidth device regions (NBDRs) located in a physical downlink shared channel (PDSCH) region of a subframe, wherein the NBDRs are subsets of frequency resources within a wide bandwidth subframe, the NBDRs include a primary NBDR and at least one secondary NBDR, the primary NBDR includes secondary NBDR configuration information, the secondary NBDR includes data, and at least one of the primary NBDR and the at least one secondary NBDR includes both an NBDR control channel and an NBDR data channel; and a transceiver module configured to transmit the primary NBDR on subcarriers located in a central part of a signal bandwidth spectrum including a direct current (DC) subcarrier, and the secondary NBDR on subcarriers within the subframe not used by the primary NBDR.

29. The node device of claim 28, wherein the subframe includes the primary NBDR and a plurality of secondary NBDRs, and node is configured to transmit data to a plurality of narrow bandwidth wireless devices using the primary NBDR and secondary NBDRs, and each narrow bandwidth wireless device is assigned a distinct primary or secondary NBDR for data communication.

30. The node device of claim 28, wherein the node is configured to communicate with a wireless wide bandwidth device using a bandwidth of at least 10 megahertz (MHz), and the narrow bandwidth wireless device using a bandwidth of approximately 1.4 MHz.

31. The node device of claim 28, wherein the node is selected from the group consisting of a base station (BS), a Node B (NB), an evolved Node B (eNB), a baseband unit (BBU), a remote radio head (RRH), a remote radio equipment (RRE), a remote radio unit (RRU), and combinations thereof.

32. The node device of claim 28, wherein the subframe includes a legacy physical downlink control channel (PDCCH) region and the physical downlink shared channel (PDSCH) region.

* * * * *